(12) United States Patent
Broadhead et al.

(10) Patent No.: US 11,457,750 B2
(45) Date of Patent: Oct. 4, 2022

(54) MAGNETIC HARDWARE DISPLAY SYSTEM

(71) Applicant: Amerock, LLC, Huntersville, NC (US)

(72) Inventors: Laura Thompson Broadhead, Huntersville, NC (US); Jessica Zingelmann Brown, Wilmington, NC (US); Keely Ann Roberts, Cornelius, NC (US); Kenneth Leahy, Atlanta, GA (US); Adam Nathaniel Sapp, Dalton, GA (US); Hugo Cesar Resendiz, Dalton, GA (US)

(73) Assignee: Amerock, LLC, Huntersville, NC (US)

( * ) Notice: Subject to any disclaimer, the term of this patent is extended or adjusted under 35 U.S.C. 154(b) by 0 days.

(21) Appl. No.: 17/173,830

(22) Filed: Feb. 11, 2021

(65) Prior Publication Data

US 2022/0248871 A1  Aug. 11, 2022

(51) Int. Cl.
  *A47F 5/08* (2006.01)
  *F16B 1/00* (2006.01)
(52) U.S. Cl.
  CPC .............. *A47F 5/08* (2013.01); *F16B 1/00* (2013.01); *F16B 2001/0035* (2013.01)
(58) Field of Classification Search
  CPC combination set(s) only.
  See application file for complete search history.

(56) References Cited

U.S. PATENT DOCUMENTS

| | | | | |
|---|---|---|---|---|
| 1,879,002 A * | 9/1932 | Alles | ......................... | G10G 1/00 40/621 |
| 2,966,992 A * | 1/1961 | Dunkelbergerjacke | .. | B25H 3/04 211/70.7 |
| 3,310,271 A * | 3/1967 | King | ..................... | A47F 5/0815 248/220.43 |
| 5,660,276 A * | 8/1997 | Winnard | .................. | B25H 3/06 206/350 |
| 6,811,127 B1 * | 11/2004 | Shiao | ........................ | B25H 3/04 211/70.6 |
| 7,461,750 B2 * | 12/2008 | Armstrong | ............... | B41K 1/58 211/39 |
| 8,336,709 B1 * | 12/2012 | Geibel | .................... | B25H 3/003 206/378 |
| 8,573,415 B2 * | 11/2013 | Ernst | ........................ | B25H 3/04 211/90.01 |
| 9,206,827 B2 * | 12/2015 | Loree | ...................... | A47B 96/02 |

(Continued)

*Primary Examiner* — Monica E Millner
(74) *Attorney, Agent, or Firm* — Reed Smith LLP; Matthew P. Frederick; Cheryl L. Gastineau

(57) ABSTRACT

A display system comprises a display board comprising opposed front and back surfaces; at least one elongated channel formed in the front surface; wherein each elongated channel is recessed with respect to the front surface of the display board. The elongated channel comprises a plurality of substantially parallel elongated channels vertically spaced from one another; a metal strip disposed within each elongated channel. The metal strip has a front surface recessed with respect to the front surface of the display board. The metal strip is configured to display at least one display item having a magnetic element. The magnetic element shares at least one dimension with the width of a respective metal strip. The cover layer covers the front surface of the display board and the metal strip disposed in each channel. The cover layer follows contours of the front surface of the metal strip disposed in each channel.

9 Claims, 6 Drawing Sheets

(56) References Cited

U.S. PATENT DOCUMENTS

| | | | |
|---|---|---|---|
| 9,700,157 B2* | 7/2017 | Keyvanloo | H01R 25/14 |
| 10,405,676 B1* | 9/2019 | Underwood | F16B 45/00 |
| 10,716,413 B2* | 7/2020 | Winnard | A47F 7/0021 |
| 10,869,561 B2* | 12/2020 | Arradondo | H01F 7/0252 |
| 2004/0256335 A1* | 12/2004 | Sholem | B25H 3/04 |
| | | | 211/70.6 |
| 2020/0405077 A1* | 12/2020 | Broadhead | G09F 5/00 |

* cited by examiner

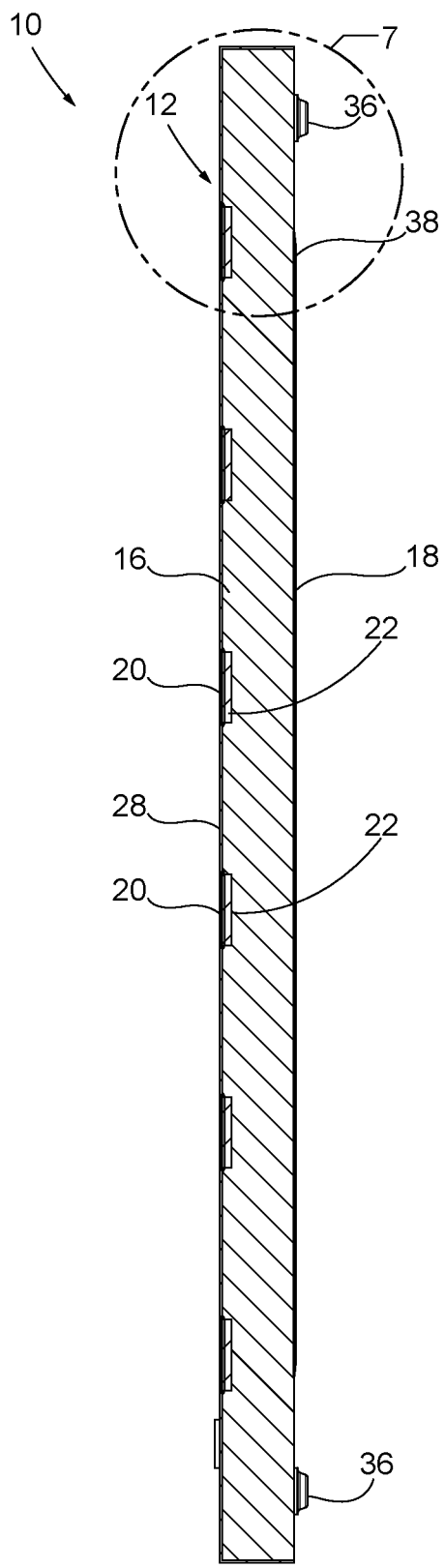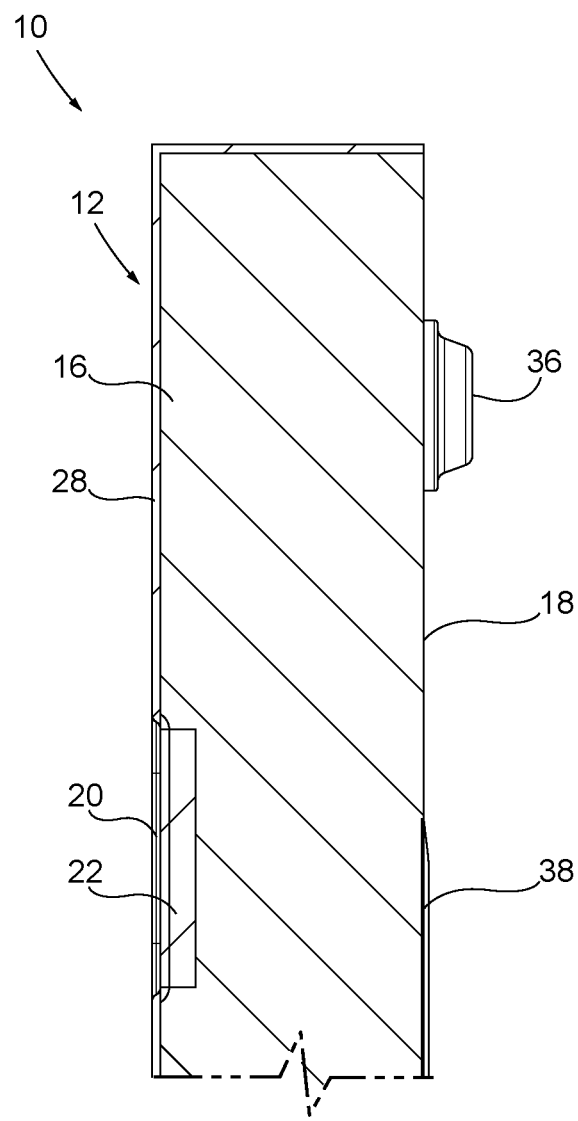
FIG. 6
FIG. 7

MAGNETIC HARDWARE DISPLAY SYSTEM

BACKGROUND

This application discloses an invention which is related, generally and in various embodiments to merchandise displays. More specifically, embodiments disclosed in this application are related to merchandise displays of household hardware products such as hooks, bath accessories, hinges, pull handles or knobs for kitchen or bathroom cabinets. Typically, household hardware products are sold in stores using displays including pull-out and tilt bins holding products of similar style or size.

SUMMARY

According to embodiments of the disclosure, a display system comprises a display board comprising opposed front and back surfaces; at least one elongated channel formed in the front surface; wherein each elongated channel is recessed with respect to the front surface of the display board, wherein the at least one elongated channel comprises a plurality of substantially parallel elongated channels vertically spaced from one another; at least one metal strip disposed within each elongated channel, wherein each elongated channel and metal strip are complimentary shaped, wherein each metal strip has a front surface recessed with respect to the front surface of the display board, wherein the at least one metal strip is configured to display at least one display item having a magnetic element attached thereto, wherein each magnetic element shares at least one dimension with the width of a respective metal strip; and a cover layer covering the front surface of the display board and the at least one metal strip disposed in each channel, wherein the cover layer follows contours of the front surface of the at least one metal strip disposed in each channel.

According to embodiments of the disclosure, the cover layer is a vacuum sealed cover layer.

According to embodiments of the disclosure, the at least one metal strip has a front facing face has a first polarity, and each magnetic element on the at least one display item has display board facing face having a second polarity, wherein the first polarity is opposite the second polarity.

According to embodiments of the disclosure, each elongated channel has a width less than a width of the display board.

According to embodiments of the disclosure, each elongated channel has a rectangular cross-section.

According to embodiments of the disclosure, there is also at least one hole on the back surface of the display board configured for mounting.

According to embodiments of the disclosure, the at least one display item is a household hardware product selected from a hook, a bath accessory, a hinge, a knob and a pull.

According to embodiments of the disclosure, at least one of the at least one display items has a mounting piece disposed between the display item and the magnetic element.

According to embodiments of the disclosure, each at least one metal strip is configured to display a plurality of display items.

BRIEF DESCRIPTION OF THE DRAWINGS

FIG. 6 shows a cross-sectional view of the magnetic merchandising display system of FIG. 1.

FIG. 7 shows a detailed cross-sectional view of FIG. 6.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Referring to FIGS. 1-7, embodiments of a magnetic merchandising display system 10 are shown. Magnetic merchandising display system 10 includes, for example, a display board 12 that allows for the ability to easily mount and remove display items 14 such as samples of household hardware products (e.g. cabinet or bath hardware) and visualize the sample hardware products mounted to e.g. kitchen or bath cabinets, by allowing a person to remove the sample hardware products and hold it up to e.g. kitchen or bath cabinets. Examples of household hardware products which may be displayed in embodiments of the magnetic merchandising display system 10 include: knobs; pulls; handles; decorative hooks; wall plates; functional cabinet hardware such as latches and hinges; and bath accessories such as towel bars/rings, toilet tissue holders, etc.

Figure 1:
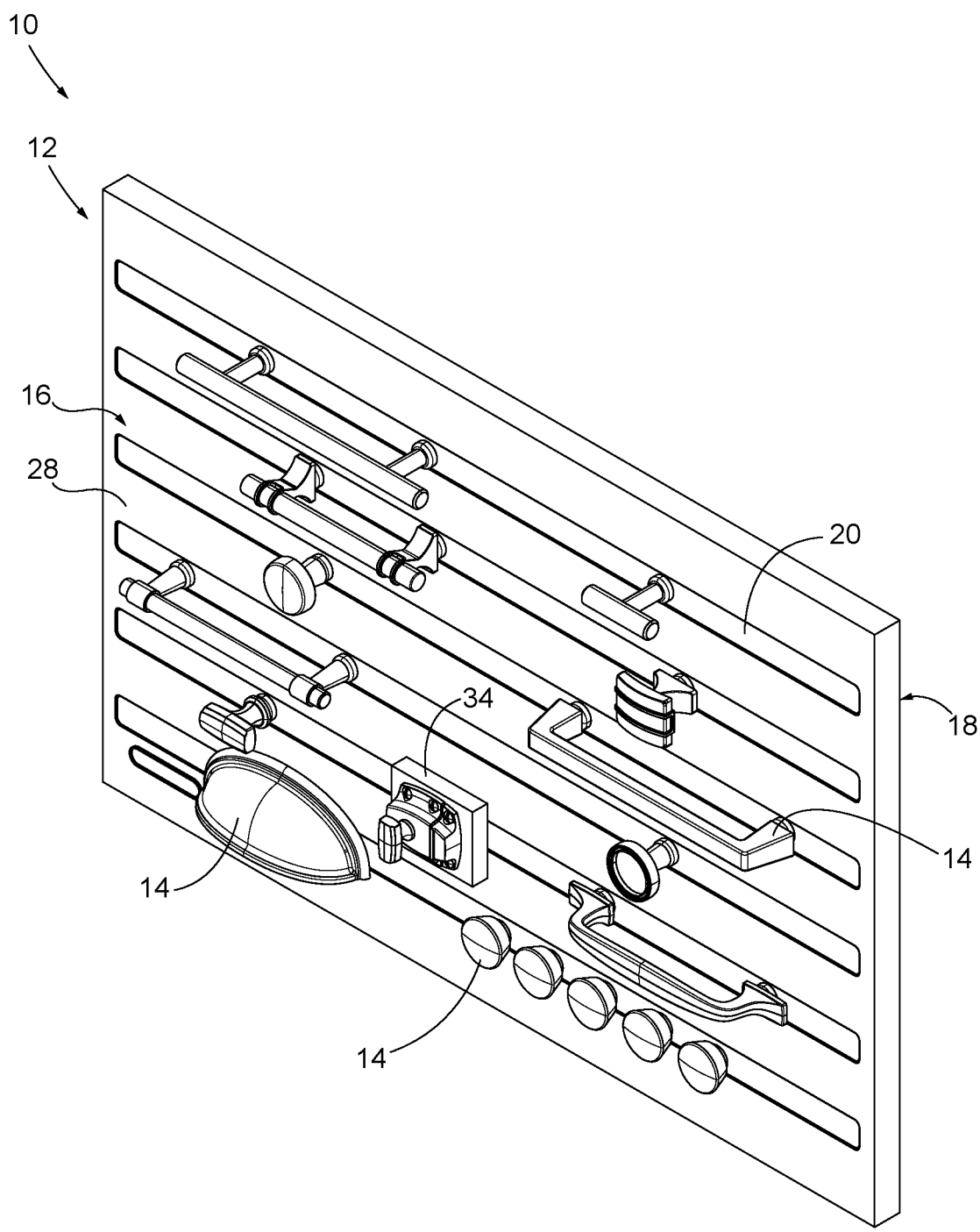
FIG. 1 shows a perspective view of the magnetic merchandising display system according to embodiments of the disclosure
Figure 2:
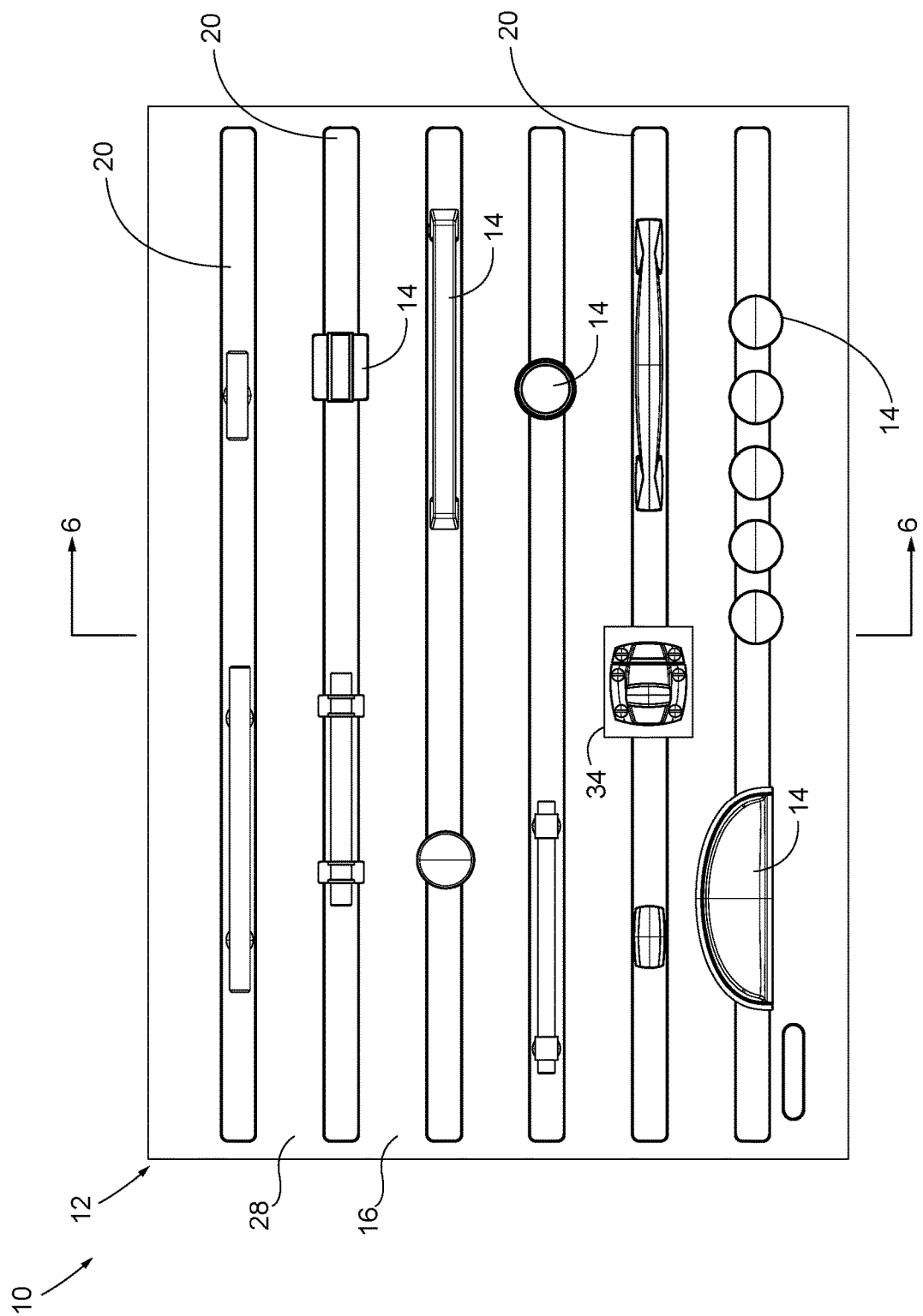
FIG. 2 shows a front view of the magnetic merchandising display system of FIG.
Figure 3:
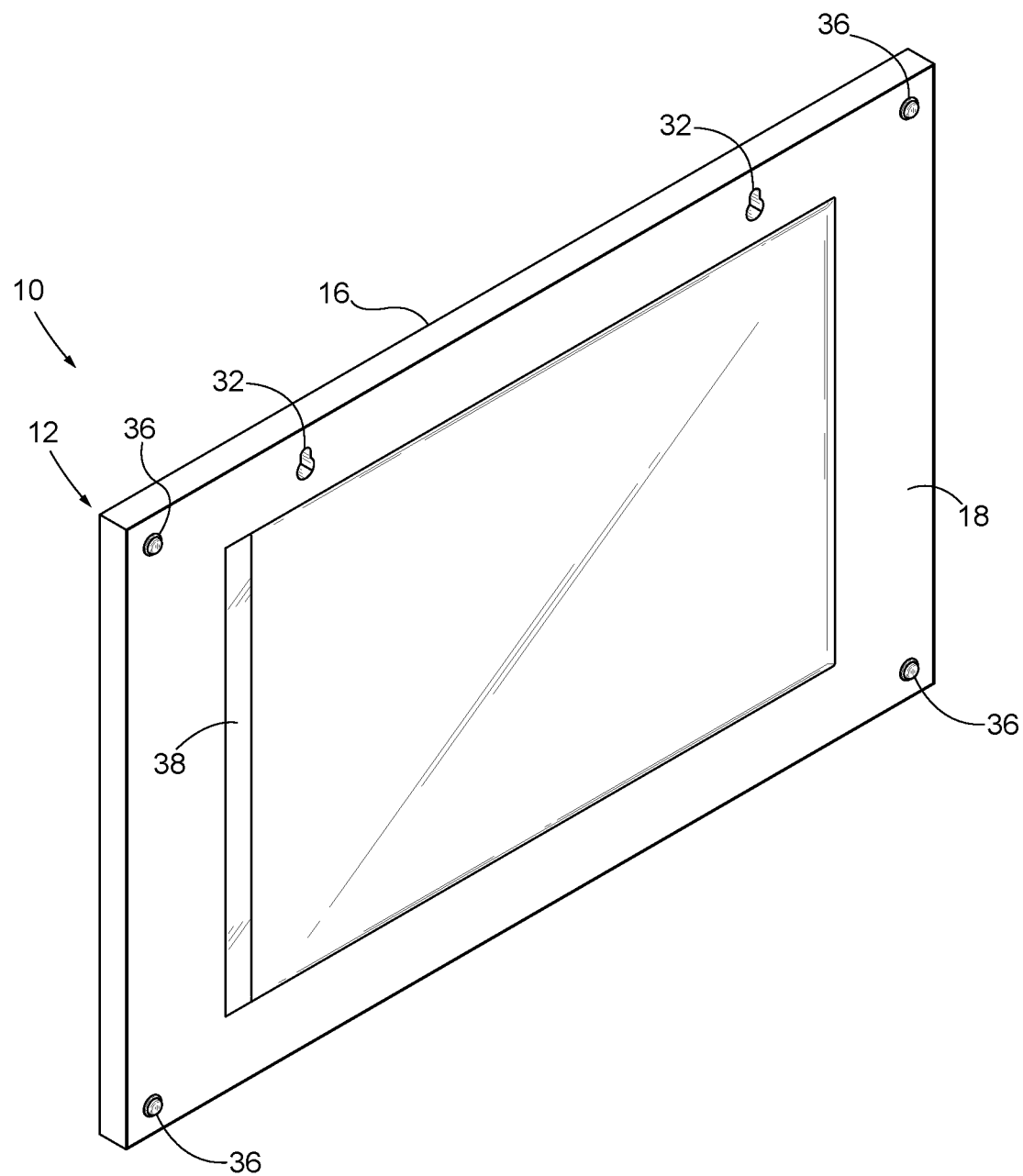
FIG. 3 shows a rear perspective view of the magnetic merchandising display system of FIG. 1.
Figure 4:
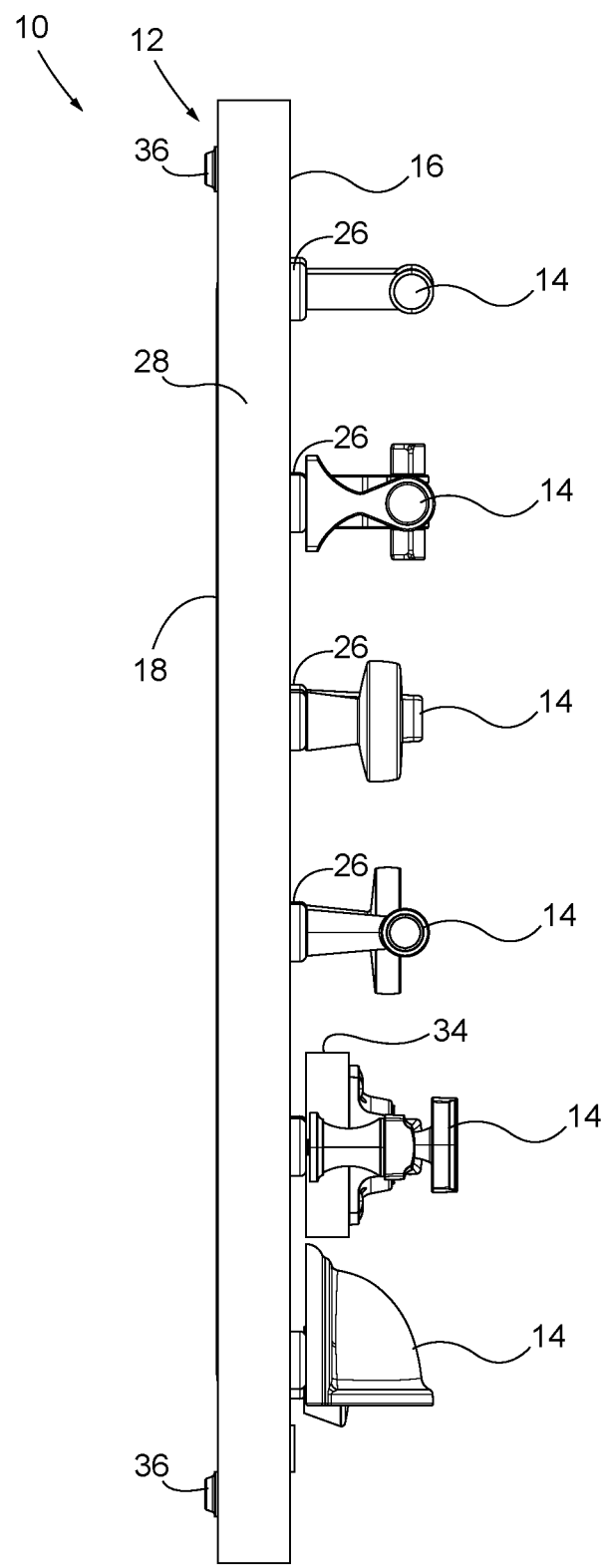
FIG. 4 shows a side view of the magnetic merchandising display system of FIG.
Figure 5:
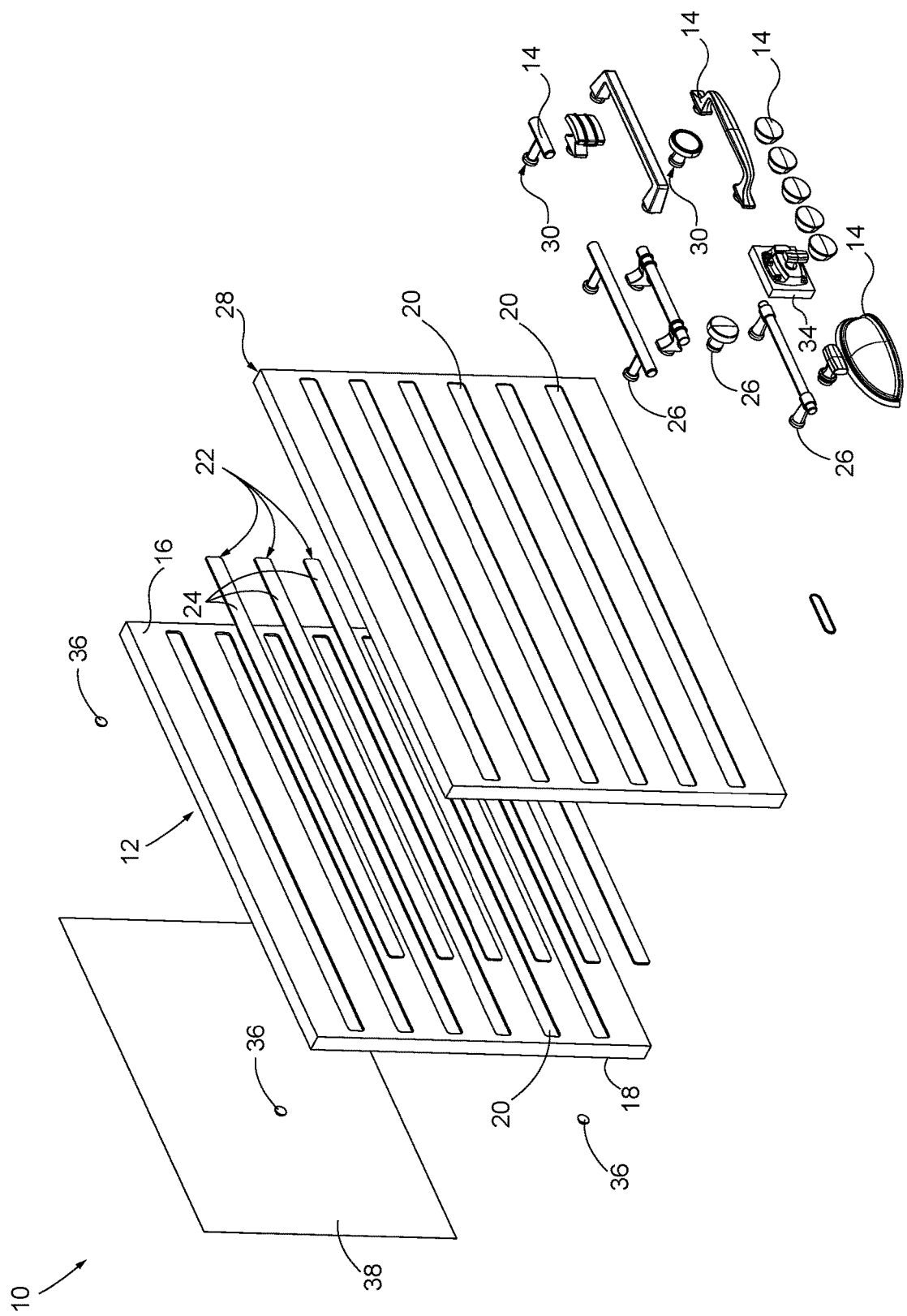
FIG. 5 shows an exploded view of the magnetic merchandising display system of FIG. 1.

Referring to FIG. 1, display board 12 may be formed from wood and includes opposed front and back surfaces 16, 18. The display board may be formed from other materials with suitable characteristics, for example, thermoplastic, particle board, aluminum, etc. Display board 12 includes at least one elongated channel 20 formed in the front surface 16. In certain embodiments, each elongated channel 20 is recessed with respect to the front surface 16 of display board 12. According to an exemplary embodiment, the at least one elongated channel 20 comprises a plurality of substantially parallel elongated channels 20 vertically spaced from one another.

In certain embodiments, at least one metal strip 22 is disposed within each elongated channel 20. In further embodiments, each elongated channel 20 and metal strip 22 are complimentary shaped. Each metal strip 22 has a front surface 24 recessed with respect to the front surface 16 of display board 12. Each metal strip 22 is configured to display at least one display item 14 having a magnetic element 26 attached thereto and may display a plurality a display items 14. The magnetic element 26 may be attached to the display item 14 by a screw. The magnetic element 26 may approximately or substantially share at least one dimension with the width of a respective metal strip 22.

In certain embodiment, metal strip 22 is composed of a ferromagnetic metal such as steel. In certain embodiments, metal strip 22 is a magnetized strip composed of a magnetized metal. in certain embodiments, the front facing face 24 of the metal strip 22 has a first polarity, and each magnetic element 26 on the at least one display item 14 has display board facing face 30 having a second polarity, wherein the first polarity is opposite the second polarity.

The at least one display item 14 may be a household hardware product selected from a hook, a bath accessory, a hinge, a knob and a pull. The at least one display items 14 may include a mounting piece 34 disposed between the display item 14 and the magnetic element 26. Mounting piece 34 is provided for those display items 14 having configurations which is not easily screwed into a magnetic element 26. Mounting piece 34 may be composed of wood.

In certain embodiments, a cover layer 28 covers the front surface 16 and sides of display board 12 and the at least one metal strip 22 disposed in each channel 20. Cover layer 28 may be composed of, a thermoplastic. In certain embodiments, the cover lay may include a thermoplastic film. In those embodiments, the film may include a thickness in a range of 5 to 15 mil. In one embodiment, the cover lay includes a white high gloss 8 mil polyvinyl film. In further embodiments, cover layer 28 is applied with a vacuum forming method so that it follows the contours of the front surface 24 of the at least one metal strip 22 disposed in each channel 20. Specifically, metal strips 22 are adhered to the inside of channels 20, for example, with an adhesive such as a strong glue. Display board 12 with metal strips 22 is covered with the cover layer 28 and placed into a sealing machine, for example, a woodworking vacuum laminating machine. The display board 12 with the cover layer 28 is heated, formed while in the machine and removed.

In embodiments of the disclosure, each elongated channel 20 has a width less than a width of display board 12.

In certain embodiment, display board 12 has the dimensions of about 20 to 25 inches, and preferably about 23.875 inches (width) by about 0.5 to 1.25 inches and preferably about 0.75 inches (depth) by about 14 to 18 inches and preferably about 15.875 inches (height). In certain embodiment, there are six channels 24 spaced about 1.5 inches apart. Each channel 24 has a width of about 19 to 24 inches and preferably 23.0625 inches, a height of about 0.75 to 1 inch and preferably 0.8125 inches and a depth of about 0.0625 to 0.25 inches and preferably about 0.125 inches prior to the insertion of a metal strip 22 and the application of the cover layer 28, and about 0.01 to 0.03 inches and preferably about 0.020 inches after the insertion of a metal strip 22 and the application of the cover layer 28.

In certain embodiments, each elongated channel 20 has a rectangular cross-section.

In certain embodiments, the back surface 18 of display board 12 has at least one hole or slot 32 configured for mounting; rubber stoppers 36 for contact with a mounting surface when mounting display board 12; and a see-through pouch 38 for holding display item 14 information and arrangement.

Although the present invention has been described in detail for the purpose of illustration, it is to be understood that such detail is solely for that purpose and that variations can be made therein by those in the art without departing from the spirit and scope of the invention.

What is claimed is:

1. A display system comprising:
    a display board comprising opposed front and back surfaces;
    at least one elongated channel formed in the front surface;
    each elongated channel is recessed with respect to the front surface of the display board, the at least one elongated channel comprises a plurality of substantially parallel elongated channels vertically spaced from one another, each elongated channel comprising a width and a length;
    at least one metal strip disposed within a corresponding elongated channel, the at least one metal strip comprising the width and the length of the corresponding elongated channel, each metal strip has a front surface recessed with respect to the front surface of the display board
    at least one display item comprising a magnetic element, the magnetic element comprising a bottom surface comprising a dimension that approximately shares the width of a respective metal strip, the dimension selected from one of a width, a length, and a diameter, the magnetic element configured to releaseably attach to the metal strip of a corresponding elongated channel; and
    a cover layer covering the front surface of the display board and the at least one metal strip disposed in each channel, the cover layer follows contours of the front surface of the at least one metal strip disposed in each channel.

2. The display system of claim 1, wherein the cover layer is a vacuum sealed cover layer.

3. The display system of claim 1, wherein the at least one metal strip has a front facing face has a first polarity, and each magnetic element on the at least one display item has display board facing face having a second polarity, wherein the first polarity is opposite the second polarity.

4. The display system of claim 1, wherein each elongated channel has a width less than a width of the display board.

5. The display system of claim 1, wherein each elongated channel has a rectangular cross-section.

6. The display system of claim 1, further comprising at least one hole on the back surface of the display board configured for mounting.

7. The display system of claim 1, wherein the at least one display item is a household hardware product selected from a hook, a bath accessory, a hinge, a knob and a pull.

8. The display system of claim 1, wherein at least one of the at least one display items has a mounting piece disposed between the display item and the magnetic element.

9. The display system of claim 1, wherein each at least one metal strip is configured to display a plurality of display items.

* * * * *